DISTRIBUTED AMPLIFIER SYSTEM
Filed June 29, 1966
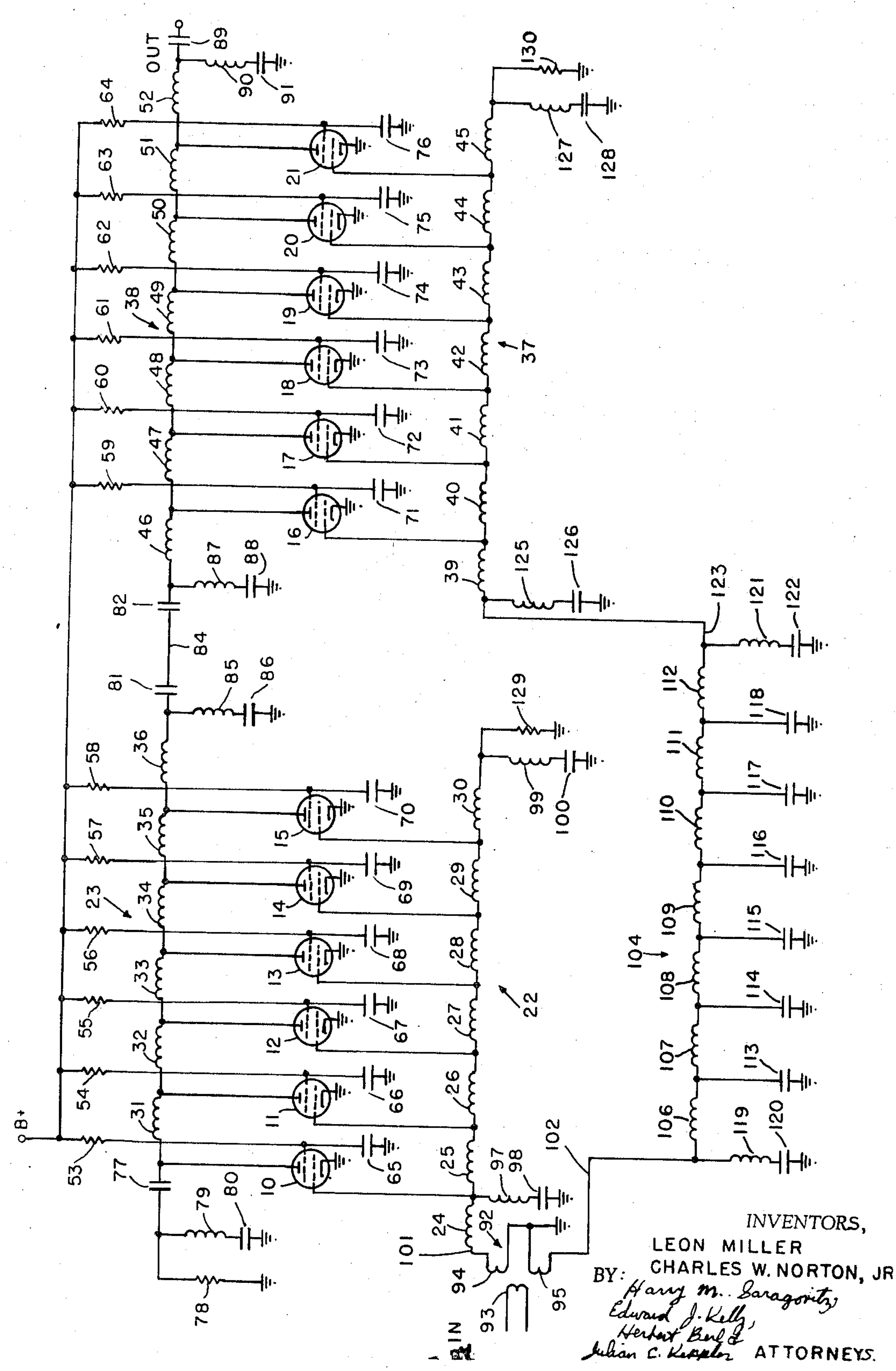
INVENTORS,
LEON MILLER
CHARLES W. NORTON, JR
BY: Harry M. Saragovitz
Edward J. Kelly
Herbert Berl
Julian C. Keppler ATTORNEYS.

3,451,004

DISTRIBUTED AMPLIFIER SYSTEM

Leon Miller, Little Silver, and Charles W. Norton, Jr., Belmar, N.J., assignors to the United States of America as represented by the Secretary of the Army Filed June 29, 1966, Ser. No. 562,931
Int. Cl. H03f 3/60
U.S. Cl. 330—54 1 Claim

ABSTRACT OF THE DISCLOSURE

A distributed amplifier system with a plurality of partial stages, each partial stage having a plurality of sections, and means to divide the input signals to be amplified and to separately feed said divided input signals to the input of a corresponding partial stage.

The present invention relates to a novel and useful amplifier system and more particularly to an amplifier system of the distributed type.

In conventional amplifiers, the high frequency response, and hence the bandwidth, is limited by the shunting effect of the tube and wiring capacity. Although bandwidth can be increased by decreasing the gain of each stage, this expedient becomes useless when the stage gain is reduced to unity or below. Further, since the overall gain of a number of cascaded stages is the product of the gains of the individual stages, the bandwidth of such a multi-stage amplifier will necessarily be less than the bandwidth of any of the individual stages. It can be shown that the upper half-power frequency of a cascaded amplifier varies approximately inversely with the square root of the number of stages. The simple paralleling of high impedance amplifying elements results in an overall gain equal to the sum of the individual gains, however, the shunting capacities of all stages are also added with the result that no increase in bandwidth results compared to that of a single stage. The distributed amplifier overcomes these limitations by paralleling the amplifying elements in such a way that the outputs thereof are additive but the shunt capacities are effectively separated. This may be accomplished, for example, by connecting the input of the tubes, or other amplifying elements, to spaced points on a first artificial transmission line called the grid or input line, the amplifier outputs being connected to equally spaced points on a second artificial transmission line called the plate or output line. Both lines are composed of a series of lumped inductors and shunt capacity which may consist in whole or in part of the input and output capacity of the tubes. If the grid, or input line is terminated in its characteristic impedance and the line is assumed to be lossless, the input impedance of the line will be independent of the number of tubes connected thereto. An input signal connected to the grid line will travel down the line, energizing each tube in sequence and then will be absorbed in the grid line termination. Normally, the end of the plate line nearest to the first tube is terminated with the characteristic impedance of the line, and is known as the reverse termination. The other end of the plate is normally to a utilization device or to the grid or input line of a cascaded distributed amplifier. Each tube or amplifier is known as a section, the entire amplifier is known as a stage. The sequential outputs of each section launch waves in the plate line in both directions. Those arriving at the reverse termination are absorbed therein and do not contribute to the output. The waves from each section traveling toward the output termination all arrive at the output at the same time and therefore add in phase, to provide a gain equal the sum of the section gains.

Distributed amplifiers have had limited power outputs particularly at high frequencies, i.e., frequencies of 100 megacycles or more. At these high frequencies power attenuation at each section becomes significant. Tube transit time effect, grid-to-cathode capacitance, and cathode lead inductance, all produce resistive loading of the grid circuit and result in a cumulative power loss at each section. This power attenuation has previously limited the number of effective sections in a stage.

The present invention comprises a novel distributed amplifier system for high frequency use.

It is an object of this invention to provide a distributed amplifier system of improved performance.

Another object is to provide a distributed amplifier system with a high power output at high frequencies.

A further object of the invention is the provision of a system with an increased number of effective sections in a distributed amplifier stage during high frequency operation.

Other objects and features of the invention will become apparent to those skilled in the art as the disclosure is made in the following description of a preferred embodiment of the invention as illustrated in the sole figure of the drawing which is a schematic circuit diagram of the preferred embodiment. Shown therein is a single stage distributed amplifier comprising two partial stages with six sections in each stage. The first stage has six tetrodes 10–15 with the second partial stage also having six tetrodes 16–21. The control grids of tetrodes 10–15 are connected to respective spaced points on the first input artificial transmission line 22, the plates or anodes of the tetrodes being respectively connected to similarly spaced points on a first output artificial transmission line 23. The first input line 22 comprises series connected inductors 24–30 respectively shunted by the interelectrode and stray wiring capacity associated with the input of tetrode tubes. Similarly, the first plate line 23 comprises series connected inductors 31–36 respectively shunted by the interelectrode and stray wiring capacity associated with the tetrode plates.

The control grids of tetrodes 16–21 are connected to spaced points on the second input artificial transmission line 37, the plates or anodes of the tetrode being respectively connected to similarly spaced points of a second output artificial transmission line 38. The second input artificial transmission line 37 comprises series connected inductors 39–45 shunted respectively by the interelectrode and stray wiring capacity associated with the input of tetrode tubes. Similarly, the second output transmission line 38 comprises series connected inductors 46–52 shunted respectively by the interelectrode and stray wiring capacity associated with tetrode plates. The screen grids of tetrodes 10–21 are connected to a positive voltage source B+ by connection to the respective screen load resistors 53–64 and filter capacitors 65–76, each of said respective load resistor and filter capacitor being series connected from voltage source B+ to ground. The cathodes of tubes 10–21 are grounded. The terminus of the first output line nearest to the first tube 10 is connected to ground through coupling capacitor 77 and resistor 78 which is shunted to ground through series connected inductor 79 and capacitor 80. The other terminus of said first output line is connected through coupling capacitor 81 and coupling capacitor 82 by connecting line 84 to the second output line at the end nearest the tube 16, said connecting line, in effect, forming said first and second output lines into a single output line. The ends of line 84 are connected to ground by a first series connected L-C circuit comprising inductor 85 and capacitor 86 and a second series connected L-C circuit comprising inductor 87 and capacitor 88. The other terminus of the second output line 38 serves, through capacitor 89, as the amplifier output and, as shown, this end of the line is connected to ground by series output L-C circuit comprising inductor 90 and capacitor 91.

The input to the amplifier system is applied through a power divider 92 containing a primary coil 93 and a pair of secondaries 94, 95. The output of secondary winding 94 is connected by input line 101 to the input of input line 22, said input line being connected to ground at its input at the junction of inductors 24 and 25 by series connected inductor 97 and capacitor 98. The other end of input line 22 is terminated to ground through the parallel arrangement of resistor 129 and series connected inductor 99 and capacitor 100. The output of secondary 95 is connected through input line 102 to the input of a delay line 104 comprising a plurality of series connected inductors 106–112 and respective capacitors 113–118 connected to ground. The delay of line 104 is equal to the delay input line 22. The ends of delay line 104 are connected to ground by series connected inductor 119 and capacitor 120 at one end and series connected inductor 121 and capacitor 122 at the other end. The output of the delay line is connected by line 123 to the input of second input transmission line 37, said second input transmission line being connected to ground through inductor 125 and capacitor 126. The other end of line 37 is terminated to ground through resistor 130 and also series connected inductor 127 and capacitor 128.

In operation, the input is divided in power divider 92 and signals are simultaneously fed to the input of the first half stage of the distributed amplifier and to the input of delay line 104. The delay line 104 introduces the same time delay to the signal as the first partial stage of the amplifier without introducing the grid losses. The output of delay line 104 is timed to reach the input of the first section, tube 16, of the second partial stage at the same time as the signal derived from the last section, tube 15, of first partial stage reaches tube 16. The output of the second partial stage adds to the output of the first partial stage providing a much larger power output than would have been obtained if all the sections were connected in the normal manner.

While two partial stages have been shown, it is readily apparent that any number of partial stages can be employed. When more than two partial stages are used, the power divider 92 is modified to provide as many outputs as partial stages, with one output connected to the input of each partial stage. With the exception of the input to the first partial stage, all the partial stage inputs contain delay means which inroduce delays equal to the time it takes for an input signal to travel through the preceding stage.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A distributed amplifier system comprising at least a first and a second distributed amplifier stages, each having an output artificial transmission line with a given delay and an input artificial transmission line with said given delay, said output artificial transmission lines of said first and said second distributed amplifier stages being connected in series; a source of input signals coupled to said input artificial transmission line of said first distributed amplifier; at least a first delay line having an input coupled to said source of input signals and an output connected to said input artificial transmission line of said second distributed amplifier stage, said first delay line having said given delay; and an output load connected to said output artificial transmission line of said second distributed amplifier stage.

References Cited

UNITED STATES PATENTS

| | | | |
|---|---|---|---|
| 2,960,664 | 11/1960 | Brodwin | 330—54 XR |
| 2,978,579 | 4/1961 | Sosin | 330—54 XR |
| 3,129,387 | 4/1964 | Sosin | 330—54 |

NATHAN KAUFMAN, *Primary Examiner.*

U.S. Cl. X.R.

330—151